July 11, 1939. R. F. DAVIS Re. 21,143

TOWEL RACK

Original Filed March 24, 1936

Inventor

Robert F. Davis

By Robert F. Davis

Attorney

Reissued July 11, 1939 Re. 21,143

UNITED STATES PATENT OFFICE 21,143

TOWEL RACK

Robert F. Davis, Washington, D. C., assignor, by mesne assignments, to The Edward Katzinger Company, a corporation of Illinois Original No. 2,141,347, dated December 27, 1938, Serial No. 70,660, March 24, 1936. Application for reissue April 25, 1939, Serial No. 270,041

7 Claims. (Cl. 211—86)

This invention relates to an improvement in towel racks and particularly to the provision of a novel towel rack that may be expeditiously located in the most convenient place. The invention further contemplates an improvement in towel racks that will to a large extent prevent towels from slipping from the rack.

The tendency in modern bathrooms is toward compactness, and this coupled with the fact that many of the modern bathrooms have tile walls, makes it difficult to find a place where extra towel racks may be satisfactorily located or attached. Of course, towel racks may be set into the tile, when the tile is placed, or later by a tile-setter, but the average individual often wants to add another towel rack after the building has been finished and does not want to take the trouble or incur the expense of employing a tile-setter. Even if the walls are plastered and the average individual can attach the towel rack himself, he must mar the finish of the wall and run the risk of cracking the plaster. Furthermore, regardless of how the rack is to be attached there is always the problem of finding a place for it. In the small, present-day bathrooms this problem is particularly serious for wall space is extremely limited.

The present invention provides an easy solution to all of these problems. According to its principles, a towel rack is constructed so that it may be easily and securely fastened onto the side of a lavatory or sink. By this arrangement the towels may be supported in the most convenient place, no wall space is needed, and the towel rack may be quickly attached or detached without in any way marring the appearance of anything in the bathroom, and without requiring any particular skill.

To still further improve the desirability of the new towel rack, the cross-bar that supports the towel may be so formed that it has, at least on its top side, a longitudinally extending, transversely concave face. Such a face has been found to give the rack a snubbing action upon the towel and tends to prevent the towel from so readily sliding off the rod. Apparently the two edges of the concave surface, which are somewhat higher than the center, serve to support the towel and the portion of the towel between these edges sinks into the concavity, thus causing the towel to break sharply over the raised edges.

Ordinarily, the new towel rack may be attached to the apron of the lavatory or sink by means of clamps, either spring or screw, fastened to the end pieces of the rack and passing around under the lower edge of the apron. A small pad of rubber, felt, or the like, placed between the towel rack ends and the apron has been found to make the rack fit better and at the same time to prevent any scratching of the enamel on the apron.

A further understanding of the detailed construction may be had by reference to the following description of an embodiment of the principles of this invention and to the appended drawing. In the drawing.

Figure 1:
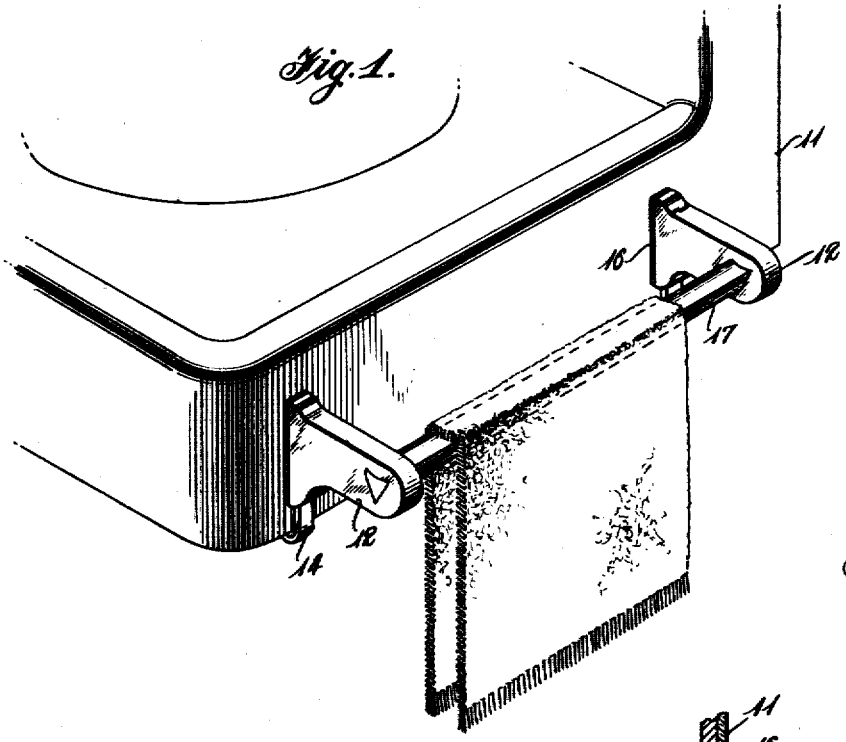
Fig. 1 is a perspective view showing the towel rack attached to a lavatory and supporting a towel.
Figure 3:
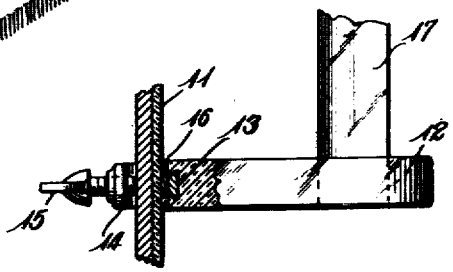
Fig. 3 is a sectional plan view taken along line 3—3 of Fig. 2.

As illustrated, the lavatory 11 is of the type that has a downwardly projecting apron around its edge. The towel rack consists of a pair of porcelain end pieces 12 each having a tapered slot in its base. A U clamp 14 which has a tapered arm 13 fitting within the tapered slot, extends around under the edge of the apron and carries a thumb-screw 15 opposite the base of the member 12. Between this base and the enamel of the lavatory apron is a pad 16 which may be of felt, rubber or any other equivalent material. There are, of course, two such towel rack ends attached to the apron of the lavatory in the manner described, and between these ends a towel-supporting bar 17 is carried in the usual manner, the ends being provided with openings or depressions into which the ends of the towel-supporting bar fit.

Figure 2:
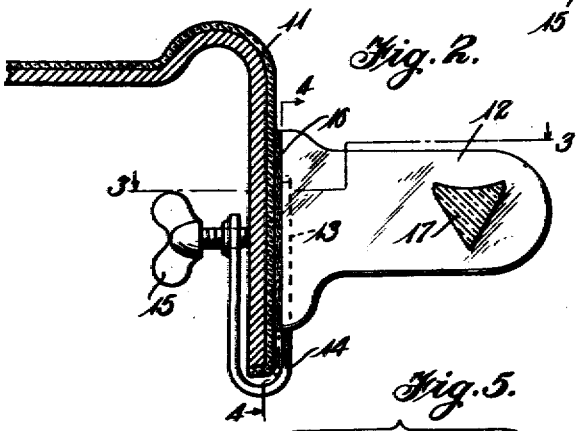
Fig. 2 is a sectional view of the same towel rack showing the manner of its attachment to the apron of the lavatory.
Figure 4:
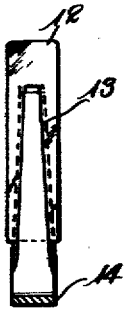
Fig. 4 is a sectional view taken along line 4—4 of Fig. 2.
Figure 5:
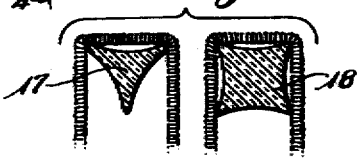
Fig. 5 is a detailed sectional view showing two alternative forms of towel-supporting bar.

The shape of the towel-supporting bar in Figs. 1 and 2 may be considered to be that of a modified triangle, the base being on top and the apex pointing downward. The shape of the triangle is modified by making the base concave and rounding the corners just enough to avoid sharpness. In the modifications shown in Fig. 5, the bar has all of its sides concave and may either be a three-sided bar 17 or a four-sided bar 18.

While it is to be understood that the embodiment specifically described and illustrated is distinctly preferred and has a number of advantages as have already been pointed out, nevertheless, it is within the scope of this invention to modify the construction by using an ordinary towel-supporting bar in the device attached to a lavatory or sink in the manner described, or by using the improved bar in an ordinary towl rack. Furthermore, it is within the scope of this invention to modify the means by which the towel rack is attached to the lavatory or sink and this may be done by using spring clamps or even rubber suction cups instead of the screw clamps that have been described. The clamps or the suction cups need not be fastened to the towel rack ends by means of the tapered slot arrangement shown but may be bolted or otherwise fastened to the towel rack by any other means. Also, the pad between the towel rack ends and the enamel of the apron may be eliminated, and the towel rack ends may be metal or wood and of any shape that is found convenient.

Although the towel rack has been mentioned as applicable to lavatories and sinks and particularly as attachable to the apron thereof, it may be attached to bath tubs or stationary laundry tubs or other similar objects, and in some cases it will be necessary or desirable to pass the clamp over the edge of the object to which it is to be attached instead of around the lower edge of an apron, or to fasten the rack to the outer surface of the object by means of suction cups. When suction cups are used, they may be provided at the factory with a tacky rubber surface covered by holland cloth which can be stripped off before applying. This causes the cups to hold tightly to the surface and yet avoids the necessity for using a separate adhesive.

I claim:

1. A towel rack suitable for attachment to the apron of a lavatory, bathtub or the like that comprises an elongated towel bar, a supporting member at each end of said bar for holding the bar and spacing it from the surface to which it is to be attached, and a clamp on each supporting member positioned so that it may be passed around the edge of the apron, grasp the apron, and hold the supporting member in place thereon, a substantial portion of the clamp being hidden by the apron when the rack is clamped in place.

2. A towel rack suitable for attachment to the apron of a lavatory, bathtub or the like that comprises an elongated towel bar, a supporting member at each end of said bar for holding the bar and spacing it from the surface to which it is to be attached, and a screw clamp on each supporting member positioned so that it may be passed around the edge of the apron, grasp the apron, and hold the supporting member in place thereon, the screw of the screw clamp being in such a position as to be hidden by the apron when the rack is clamped in place.

3. A towel rack as described in claim 1 in which pads are provided on each of the supporting members of the towel rack to space the towel rack from the surface to which it is attached.

4. A towel rack suitable for attachment to the apron of a lavatory, bathtub or the like that comprises an elongated towel bar, a supporting member at each end of said bar for holding the bar and spacing it from the surface to which it is to be attached, each of said supporting members having a tapered slot therein, and a U-shaped clamp attached to each of said supporting members by having one end thereof fitted in to said tapered slot, said U-shaped clamp having a screw member in the end opposite to that which fits into the tapered slot and being positioned so that it may pass around the edge of the apron, grasp the apron and hold the supporting member in place thereon, the screw member being hidden by the apron when the rack is clamped in place.

5. A towel rack suitable for attachment to the apron of a lavatory, bathtub or the like that comprises an elongated towel bar, a supporting member at each end of said bar for holding the bar and spacing it from the surface to which it is to be attached, and a U-shaped member on each supporting member positioned so that it may be passed around the edge of the apron, said U-shaped member having means on its inner end to engage the inner surface of the apron and hold the supporting member in place thereon, a substantial portion of the U-shaped member being hidden by the apron when the supporting member is thus held.

6. A towel rack suitable for attachment to the apron of a lavatory, bathtub or the like that comprises an elongated towel bar, a supporting member at each end of said bar for holding the bar and spacing it from the surface to which it is to be attached, and a clamp on each supporting member constructed and positioned to be passed around the edge of the apron, resiliently to grasp the apron, and hold the supporting member in place thereon, a substantial portion of the clamp being hidden by the apron when the rack is clamped in place.

7. A towel rack suitable for attachment to the apron of a lavatory, bathtub or the like that comprises an elongated towel bar, a supporting member at each end of said bar for holding the bar and spacing it from the surface to which it is to be attached, and a U-shaped member on each supporting member positioned so that it may be passed around the edge of the apron, said U-shaped member having means on its inner end to engage the inner surface of the apron, a substantial portion of the U-shaped member being hidden by the apron when thus positioned, there being means for causing resilient engagement between the U-shaped member and apron to hold the supporting member in place.

ROBERT F. DAVIS.

DISCLAIMER

Re. 21,143.—*Robert F. Davis*, Washington, D. C. TOWEL RACK. Patent dated July 11, 1939. Disclaimer filed October 26, 1940, by the assignee, *The Edward Katzinger Company*.

Hereby enters this disclaimer to claims 1, 2, and 5 of said Letters Patent.

[*Official Gazette November 19, 1940.*]